(12) United States Patent
Han et al.

(10) Patent No.: US 9,734,266 B2
(45) Date of Patent: Aug. 15, 2017

(54) COMPUTER-AIDED DESIGN MULTI-USER DESIGN NEGOTIATION SYSTEM AND METHOD THEREOF

(71) Applicant: IronCAD, LLC, Atlanta, GA (US)

(72) Inventors: Tao-Yang Han, Atlanta, GA (US); Yawei Li, Atlanta, GA (US); Cary O'Connor, Atlanta, GA (US)

(73) Assignee: IRONCAD, LLC, Atlanta, GA (US)

( * ) Notice: Subject to any disclaimer, the term of this patent is extended or adjusted under 35 U.S.C. 154(b) by 697 days.

(21) Appl. No.: 14/063,775

(22) Filed: Oct. 25, 2013

(65) Prior Publication Data

US 2014/0278275 A1    Sep. 18, 2014

Related U.S. Application Data

(60) Provisional application No. 61/798,730, filed on Mar. 15, 2013.

(51) Int. Cl.
*G06F 17/50* (2006.01)
*G06F 3/0484* (2013.01)
*G06T 17/10* (2006.01)
*G06T 19/00* (2011.01)

(52) U.S. Cl.
CPC .......... *G06F 17/5004* (2013.01); *G06F 17/50* (2013.01); *G06F 3/04845* (2013.01); *G06F 2217/04* (2013.01); *G06T 17/10* (2013.01); *G06T 19/00* (2013.01)

(58) Field of Classification Search
None
See application file for complete search history.

(56) References Cited

U.S. PATENT DOCUMENTS

| | | | | |
|---|---|---|---|---|
| 5,311,784 | A | * 5/1994 | Girard | G01B 21/04 700/175 |
| 5,710,921 | A | * 1/1998 | Hirose | G06Q 10/10 718/106 |
| 5,850,535 | A | * 12/1998 | Maystrovsky | G06T 17/00 345/418 |
| 5,894,310 | A | * 4/1999 | Arsenault | G06F 3/04845 345/419 |

(Continued)

*Primary Examiner* — Kibrom K Gebresilassie
(74) *Attorney, Agent, or Firm* — Locke Lord LLP; Tim Tingkang Xia, Esq.

(57) ABSTRACT

In one aspect, a computer-implemented method of performing multi-user design negotiation on a computer-aided design (CAD) software is disclosed. The method includes: receiving, from a first user, a design change to the geometric shape design, and obtaining information of the design change implementable on a CAD model of the geometric shape design through the CAD software; storing the information of the design change as a design change suggestion (DCS) object; transmitting the DCS object, together with the CAD model, to a second user; and receiving, from the second user, an instruction to the DCS object, and performing an operation corresponding to the instruction to the DCS object. In response to a what-if instruction, the operation is a what-if operation to the geometric shape design with the design change according to the DCS object. In response to an accepting or rejection instruction, the operation includes accepting or rejecting the design change.

47 Claims, 8 Drawing Sheets

(56) References Cited

U.S. PATENT DOCUMENTS

| | | | |
|---|---|---|---|
| 6,336,134 B1 * | 1/2002 | Varma | H04L 12/1813 709/201 |
| 6,392,645 B1 * | 5/2002 | Han | G06T 17/10 345/420 |
| 6,489,957 B1 * | 12/2002 | Han | G06T 17/00 345/420 |
| 6,781,597 B1 * | 8/2004 | Vrobel | G06F 3/04815 345/619 |
| 6,912,445 B2 * | 6/2005 | Shiroyama | G06T 17/00 318/568.11 |
| 6,995,760 B1 * | 2/2006 | Horiike | G06T 17/10 345/419 |
| 7,043,695 B2 * | 5/2006 | Elber | G06T 17/00 345/418 |
| 7,103,434 B2 * | 9/2006 | Chernyak | G06F 17/50 700/103 |
| 7,176,942 B2 * | 2/2007 | Chartier | G05B 19/41805 345/619 |
| 7,206,661 B2 * | 4/2007 | Subrahmanyam | G06F 17/50 345/420 |
| 7,337,093 B2 * | 2/2008 | Ramani | G06F 17/50 345/427 |
| 7,408,560 B2 * | 8/2008 | Staples | G06F 3/04845 345/419 |
| 7,479,959 B2 * | 1/2009 | Han | G06T 19/00 345/420 |
| 7,492,364 B2 * | 2/2009 | Devarajan | G06T 17/00 345/419 |
| 8,332,061 B2 * | 12/2012 | Baloch | G06F 17/50 700/182 |
| 8,896,597 B2 * | 11/2014 | Staples | G06F 17/50 345/420 |
| 9,052,907 B2 * | 6/2015 | Gores | G06Q 10/06 |
| 9,454,623 B1 * | 9/2016 | Kaptsan | G06F 17/50 |
| 2003/0204279 A1 * | 10/2003 | Yokohari | G05B 19/4097 700/98 |
| 2004/0088239 A1 * | 5/2004 | Eder | G06Q 10/04 705/36 R |
| 2005/0131720 A1 * | 6/2005 | Andrews | G06Q 10/103 705/301 |
| 2005/0188348 A1 * | 8/2005 | Han | G06T 19/00 717/105 |
| 2006/0106474 A1 * | 5/2006 | Mancuso | G06F 17/50 700/97 |
| 2006/0265496 A1 * | 11/2006 | Freitag | G06F 17/50 709/224 |
| 2007/0174281 A1 * | 7/2007 | Chase | H04N 7/17318 |
| 2007/0179976 A1 * | 8/2007 | Arvin | G06F 17/50 |
| 2008/0316204 A1 * | 12/2008 | Deslandes | G06F 17/5086 345/419 |
| 2010/0042676 A1 * | 2/2010 | Seroussi | G06F 17/5004 709/203 |
| 2011/0307281 A1 * | 12/2011 | Creveling | G06Q 10/063 705/7.11 |
| 2012/0089562 A1 * | 4/2012 | Deremigio | G06F 17/30563 707/602 |
| 2012/0109350 A1 * | 5/2012 | Buchowski | G06F 17/50 700/98 |
| 2012/0109589 A1 * | 5/2012 | Thompson | G06F 17/5086 703/1 |
| 2012/0109591 A1 * | 5/2012 | Thompson | G06F 17/50 703/1 |
| 2012/0268463 A1 * | 10/2012 | Loberg | G06F 17/5004 345/420 |
| 2014/0019148 A1 | 1/2014 | Buzz | |
| 2014/0278269 A1 * | 9/2014 | Winn | G06F 17/50 703/1 |

* cited by examiner ial patent
COMPUTER-AIDED DESIGN MULTI-USER DESIGN NEGOTIATION SYSTEM AND METHOD THEREOF

CROSS-REFERENCE TO RELATED PATENT APPLICATION

This application claims priority to and the benefit of, pursuant to 35 U.S.C. §119(e), U.S. provisional patent application Ser. No. 61/798,730, filed Mar. 15, 2013, entitled "DESIGN NEGOTIATION VIA GEOMETRIC AND GENERAL RED-LINING," by Tao Yang Han, Yawei Li and Cary O'Connor, the disclosure of which is incorporated herein in their entirety by reference.

FIELD OF THE INVENTION

This invention relates generally to computer-aided design (CAD) methods and software applications, and particularly to CAD multi-user design negotiation systems and methods via geometric markups and general red-linings used for CAD software applications.

BACKGROUND OF THE INVENTION

In Microsoft Word® documents, the red-lining capability gives a convenient way to enable multiple parties to change, accept, reject, or modify the changes in the documents. Since texts constitute the major content of the documents, it is easy to recognize and understand the changes of the texts made by each of the multiple parties.

In a computer-aided design (CAD, designing geometric shape and its attributes) process, it is usually needed for multiple parties to discuss and negotiate the design changes. Today, in the design communication, multiple parties may use Word documents and red-lining capabilities to exchange design ideas, or use viewer software to attach markups and text notes to the object under design indicating the desired changes. However, there are many cases the desired changes, especially involving complicated geometry modifications, are difficult, if not impossible, to fully describe by text and be understood by other parties. Thus, new methodologies and technology to enable design change negotiation through CAD processes is highly desired.

Therefore, a heretofore unaddressed need exists in the art to address the aforementioned deficiencies and inadequacies.

SUMMARY OF THE INVENTION

In one aspect, the present invention relates to a computer-implemented method of performing multi-user design negotiation on a CAD software. In one embodiment, the method includes: (a) receiving, from a first user of the CAD software, a design change to a geometric shape design, and obtaining information of the design change implementable on a CAD model of the geometric shape design through the CAD software, wherein the information of the design change includes shape geometry change and shape attributes change; (b) storing the information of the design change as a first design change suggestion (DCS) object; (c) transmitting the first DCS object, together with CAD model, to a second user of the CAD software; and (d) receiving, from the second user, a first instruction to the first DCS object, and performing a first operation to the geometric shape design corresponding to the first instruction to the first DCS object. In certain embodiments, the first operation includes: (i) retrieving the information of the design change in the first DCS object; (ii) when the first instruction comprises an accepting instruction, incorporating the design change to the geometric shape design according to the information of the design change; (iii) when the first instruction comprises a rejecting instruction, deleting the first DCS object; (iv) when the first instruction comprises a display change instruction, displaying the design change according to the information of the design change; (v) when the first instruction comprises a preview instruction, displaying the geometric shape design with the design change applied according to the information of the design change; (vi) when the first instruction comprises a property query instruction, displaying inquired properties of the geometric shape design having the design change applied according to the information of the design change; (vii) when the first instruction comprises a comparison instruction, displaying geometry and property comparison between the geometric shape design with and without the design change applied according to the information of the design change; (viii) when the instruction comprises an adjustment modification instruction, adjusting the information of the design change; (ix) when the first instruction comprises a replacement modification instruction, creating a replacement design change to the design change; and (x) when the first instruction comprises a sequential modification instruction, creating a sequential design change following the design change such that the design change and the sequential design change form a sequential design change group.

In certain embodiments, the design change and the replacement design change respectively include at least one of: adding a new design feature; deleting an existing design feature; replacing the existing design feature by the new design feature; modifying topology and geometry of the CAD model through direct modeling; changing one or more design properties of the existing design feature; changing one or more design attributes of the geometric shape design; and adding a design-related document to the geometric shape design.

In certain embodiments, the design properties of the existing design feature include a position of the existing design feature, an orientation of the existing design feature, and a dimension of the existing design feature.

In certain embodiments, the design attributes of the geometric shape design include material, appearance and manufacturing details of the geometric shape design.

In certain embodiments, the step (b) includes: receiving, from the first user through a standard user interface of the CAD software, an action to implement the design change directly on the geometric shape design; and capturing the action to implement the design change to obtain the information of the design change.

In certain embodiments, the step (b) includes: receiving, from the first user through a predetermined design change template, a selection of a design change option of the predetermined design change template as the design change; retrieving template information of the selected design change option from the predetermined design change template; and converting the template information to the information of the design change.

In certain embodiments, the step (c) includes: notifying the second user about the first DCS object.

In certain embodiments, the step (ii) further includes: when the first instruction comprises the accepting instruction, automatically incorporating the design change to the geometric shape design according to the information of the design change without further user interaction.

In certain embodiments, the step (vi) further includes: sending inquiries of the properties to a database; retrieving, from the database, the inquired properties of the geometric shape design having the design change applied according to the information of the design change; and displaying the inquired properties.

In certain embodiments, the database is a company database, a database of an enterprise resource planning (ERP) system of a supplier, or a back office database.

In certain embodiments, the inquired properties of the geometric shape design include physical properties of the geometric shape design and procurement properties of the geometric shape design.

In certain embodiments, the procurement properties of the geometric shape design include inventory availability, manufacturing and shipping prices, and time schedule.

In certain embodiments, the step (ix) includes: obtaining information of the replacement design change implementable on the CAD model of the geometric shape design through the CAD software, wherein the information of the replacement design change includes shape geometry change and shape attributes change; storing the information of the replacement design change as a second DCS object; transmitting the second DCS object, together with the CAD model, to the first user; and receiving, from the first user, a second instruction to the second DCS object, and performing a second operation to the geometric shape design corresponding to the second instruction to the second DCS object.

In certain embodiments, the second operation includes: (1) retrieving the information of the replacement design change in the second DCS object; (2) when the second instruction includes the accepting instruction, incorporating the replacement design change to the geometric shape design according to the information of the replacement design change; (3) when the second instruction includes the rejecting instruction, deleting the second DCS object; (4) when the second instruction includes the display change instruction, displaying the replacement design change according to the information of the replacement design change; (5) when the second instruction includes the preview instruction, displaying the geometric shape design with the design change applied according to the information of the replacement design change; (6) when the second instruction includes the property query instruction, displaying the inquired properties of the geometric shape design having the design change applied according to the information of the replacement design change; (7) when the second instruction includes the comparison instruction, displaying geometry and property comparison between the geometric shape design with and without the replacement design change applied according to the information of the replacement design change; (8) when the second instruction comprises the adjustment modification instruction, adjusting information of the replacement design change; and (9) when the second instruction includes the sequential modification instruction, creating a sequential design change following the replacement design change such that the replacement design change and the sequential design change form a sequential design change group.

In certain embodiments, the step (2) includes: when the second instruction includes the accepting instruction, automatically incorporating the replacement design change to the geometric shape design according to the information of the replacement design change without further user interaction.

In certain embodiments, the step (x) further includes: obtaining information of the sequential design change implementable over the design change through the CAD software, wherein the information of the sequential design change includes shape geometry change and shape attributes change; storing the information of the sequential design change as a third DCS object and together with the first DCS to form a sequential design change group; transmitting the third DCS object, together with the CAD model and the first DCS object, to the first user; and receiving, from the first user, a third instruction to the third DCS object, and performing a third operation to the geometric shape design corresponding to the third instruction to the third DCS object.

In certain embodiments, the third operation includes: (A) retrieving the information of the design change in the first DCS object and the information of the sequential design change in the third DCS object; (B) when the third instruction includes the accepting instruction, incorporating the design change and the sequential design change to the geometric shape design according to the information of the design change and the information of the sequential design change; (C) when the third instruction includes the rejecting instruction, deleting the first DCS object and the third DCS object; (D) when the third instruction includes the display change instruction, displaying the design change and the sequential design change according to the information of the design change and the sequential design change; (E) when the third instruction includes the preview instruction, displaying the geometric shape design with the design change and the sequential design change both applied according to the information of the design change and the information of the sequential design change; (F) when the third instruction includes the property query instruction, displaying the inquired properties of the geometric shape design having the design change and the sequential design change both applied according to the information of the design change and the sequential design change; (G) when the third instruction includes the comparison instruction, displaying geometry and property comparison between the geometric shape design with and without the design change and the sequential design change both applied according to the information of the design change and the information of the sequential design change; and (H) when the third instruction includes the adjustment modification instruction, adjusting information of the sequential design change.

In certain embodiments, the step (B) includes: when the third instruction includes the accepting instruction, automatically incorporating the design change and the sequential design change to the geometric shape design according to the information of the design change and the information of the sequential design change without further user interaction.

In another aspect of the present invention, a computer-implemented method of performing multi-user design negotiation on a CAD software is disclosed. In one embodiment, the method includes: (a) receiving, from a first user of the CAD software, a design change to a geometric shape design, and obtaining information of the design change implementable on a CAD model of the geometric shape design through the CAD software, wherein the information of the design change includes shape geometry change and shape attributes change; (b) storing the information of the design change as a design change suggestion (DCS) file; (c) transmitting the DCS object, together with the CAD model to a second user of the CAD software; and (d) receiving, from the second user, an instruction, and performing an operation to the geometric shape design corresponding to the instruction. In certain embodiments, the operation includes: performing a what-if operation to the geometric shape design with the design change according to the DCS object when the instruction comprises a what-if instruction; accepting the design change when the instruction is an accepting instruction; and rejecting the design change when the instruction is a rejecting instruction.

In certain embodiments, the design change includes at least one of: adding a new design feature to the geometric shape design; deleting an existing design feature of the geometric shape design; replacing the existing design feature of the geometric shape design by the new design feature; modifying topology and geometry of the CAD model of the geometry shape design through direct modeling; changing one or more design properties of the existing design feature of the geometric shape design; changing one or more design attributes of the geometric shape design; and adding a design-related document to the existing design feature of the geometric shape design.

In certain embodiments, the design properties of the existing design feature include a position of the existing design feature, an orientation of the existing design feature, and a dimension of the existing design feature.

In certain embodiments, the design attributes of the geometric shape design include material, appearance, and manufacturing details of the geometric shape design.

In certain embodiments, the step (b) includes: receiving, from the first user through a standard user interface of the CAD software, an action to implement the design change directly on the geometric shape design; and capturing the action to implement the design change to obtain the information of the design change.

In certain embodiments, the step (b) includes: receiving, from the first user through a predetermined design change template, a selection of a design change option of the predetermined design change template as the design change; retrieving template information of the selected design change option from the predetermined design change template; and converting the template information to the information of the design change.

In certain embodiments, the what-if operation includes: (i) retrieving the information of the design change in the DCS object; (ii) when the what-if instruction comprises a display change instruction, displaying the design change according to the information of the design change; (iii) when the what-if instruction comprises a preview instruction, displaying the geometric shape design with the design change applied according to the information of the design change; (iv) when the what-if instruction comprises a property query instruction, displaying inquired properties of the geometric shape design having the design change applied according to the information of the design change; (v) when the what-if instruction comprises a comparison instruction, displaying geometry and property comparison between the geometric shape design with and without the design change applied according to the information of the design change; (vi) when the what-if instruction comprises an adjustment modification instruction, adjusting information of the design change; (vii) when the what-if instruction comprises a replacement modification instruction, creating a replacement design change to the design change; and (viii) when the what-if instruction comprises a sequential modification instruction, creating a sequential design change following the design change such that the design change and the sequential design change form a sequential design change group.

In certain embodiments, the replacement design change comprises at least one of: adding a new design feature to the geometric shape design; deleting an existing design feature of the geometric shape design; replacing the existing design feature of the geometric shape design by the new design feature; modifying topology and geometry of the CAD model of the geometry shape design through direct modeling; changing one or more design properties of the existing design feature of the geometric shape design; changing one or more design attributes of the geometric shape design; and adding a design-related document to the existing design feature of the geometric shape design.

In certain embodiments, the sequential design change comprises at least one of: adding a new design feature following the design change; deleting an existing design feature following the design change; replacing the existing design feature following the design change by the new design feature; modifying topology and geometry of the CAD model through direct modeling following the design change; changing one or more design properties of the existing design feature following the design change; changing one or more design attributes of the geometric shape design following the design change; and adding a design-related document to the geometric shape design following the design change.

In certain embodiments, the step (iv) further includes: sending inquiries of the properties to a database; retrieving, from the database, the inquired properties of the geometric shape design having the design change applied according to the information of the design change; and displaying the inquired properties.

In certain embodiments, the database is a company database, a database of an ERP system of a supplier, or a back office database.

In certain embodiments, the inquired properties of the geometric shape design include physical properties of the geometric shape design and procurement properties of the geometric shape design.

In certain embodiments, the procurement properties of the geometric shape design include inventory availability, manufacturing and shipping prices, and time schedule.

In certain embodiments, the step of accepting the design change includes: retrieving the information of the design change in the DCS object; and automatically incorporating the design change to the geometric shape design according to the information of the design change without further user interaction.

In certain embodiments, the step of rejecting the design change includes deleting the DCS object.

Another aspect of the present invention relates to a CAD multi-user design negotiation system. In certain embodiments, the system includes: a CAD software executable by at least one computing device, configured to implement a geometric shape design; a design change generating module executable by at least one computing device, for receiving a design change to the geometric shape design, obtaining information of the design change, and storing the information of the design change in a design change suggestion (DCS) object, wherein the information of the design change includes shape geometry change and shape attributes change; and a DCS implementing module executable by at least one computing device, for performing an operation to the geometric shape design with the design change according to the DCS object. In certain embodiments, the operation includes: (i) retrieving the information of the design change in the DCS object; (ii) incorporating the design change to the geometric shape design according to the information of the design change in response to an accepting instruction; (iii) deleting the DCS object in response to a rejecting instruction; (iv) displaying the design change according to the information of the design change in response to a display change instruction; (v) displaying the geometric shape design with the design change applied according to the information of the design change in response to a preview instruction; (vi) displaying the inquired properties of the geometric shape design having the design change applied according to the information of the design change in response to a property query instruction; (vii) displaying geometry and property comparison between the geometric shape design with and without the design change applied according to the information of the design change in response to a comparison instruction; (viii) adjusting information of the design change in response to an adjustment modification instruction; (ix) creating a replacement design change to the design change in response to a replacement modification instruction; and (x) creating a sequential design change following the design change such that the design change and the sequential design change form a sequential design change group in response to a sequential modification instruction.

In certain embodiments, the design change and the replacement design change respectively include at least one of: adding a new design feature; deleting an existing design feature; replacing the existing design feature by the new design feature; modifying topology and geometry of the CAD model through direct modeling; changing one or more design properties of the existing design feature; changing one or more design attributes of the geometric shape design; and adding a design-related document to the existing design feature. In certain embodiments, the design properties of the existing design feature include a position of the existing design feature, an orientation of the existing design feature, and a dimension of the existing design feature. In certain embodiments, the design attributes of the geometric shape design include material, appearance, and manufacturing details of the geometric shape design.

In certain embodiments, the sequential design change includes at least one of: adding a new design feature following the design change; deleting an existing design feature following the design change; replacing the existing design feature following the design change by the new design feature; modifying topology and geometry of the CAD model through direct modeling following the design change; changing one or more design properties of the existing design feature following the design change; and adding a design-related document to the geometric shape design following the design change. In certain embodiments, the design properties of the existing design feature include a position of the existing design feature, an orientation of the existing design feature, and a dimension of the existing design feature. In certain embodiments, the design attributes of the geometric shape design include material, appearance, and manufacturing details of the geometric shape design.

In certain embodiments, the design change generating module is configured to: receive, through a standard user interface of the CAD software, an action to implement the design change directly on the geometric shape design; and capture the action to implement the design change to obtain the information of the design change.

In certain embodiments, the design change generating module includes a predetermined design change template. In certain embodiments, the design change generating module is configured to: receive a selection of a design change option of the predetermined design change template as the design change; retrieve template information of the selected design change option from the predetermined design change template; and convert the template information to the information of the design change.

In certain embodiments, the step (vi) further includes: sending inquiries of the properties to a database; retrieving, from the database, the inquired properties of the geometric shape design having the design change applied according to the information of the design change; and displaying the inquired properties.

In certain embodiments, the database is a company database, a database of an ERP system of a supplier, or a back office database.

In certain embodiments, the inquired properties of the geometric shape design include physical properties of the geometric shape design and procurement properties of the geometric shape design.

In certain embodiments, the procurement properties of the geometric shape design include inventory availability, manufacturing and shipping prices, and time schedule.

In certain embodiments, the at least one computing device is a desktop computer, a laptop computer, a tablet device, or a mobile device.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The following figures are presented for the purpose of illustration only, and are not intended to be limiting.

DETAILED DESCRIPTION OF THE INVENTION

Figure 1A:
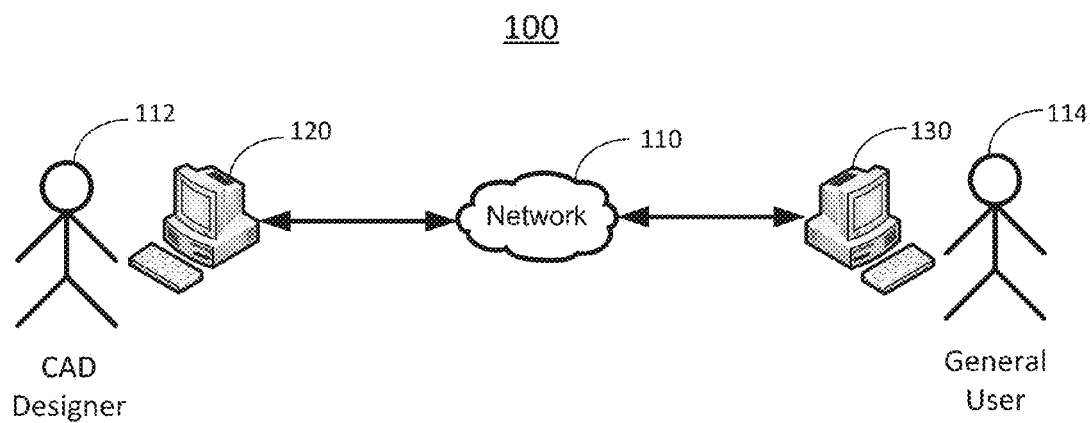
FIGS. 1A and 1B schematically show a CAD multi-user design negotiation system according to certain embodiments of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "computer-aided design software" or its abbreviation "CAD software" may refer to computer-aided design software and any other design collaboration software.

As used herein, the term "module" may refer to, be part of, or include suitable software components that provide the described functionality. In certain embodiments, the term module may include both software components, such as codes, and hardware components that execute the codes.

The term "code", as used herein, may include software, firmware, and/or microcode, and may refer to programs, routines, functions, classes, and/or objects. The term "shared", as used herein, means that some or all code from multiple hardware modules may be executed using a single (shared) processor. In addition, some or all code from multiple hardware modules may be stored by a single (shared) memory. The term "group", as used herein, means that some or all code from a single hardware module may be executed using a group of processors. In addition, some or all code from a single hardware module may be stored using a group of memories.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Overview of the Invention

CAD processes is not only the design of the final geometry of a shape but also additional information such as how the shape was constructed, engineering design intent, material and other physical properties, procurement properties, and manufacture attributes, etc. Therefore, for a geometric shape design, a design change may modify geometry as well as influencing change on other design related information and properties. Two different design changes that result in identical geometry may cause different influence on other design properties.

Consequently, when a geometric shape design involves multiple users or parties, it is critical for all parties participating in the design negotiation to fully understand the design changes proposed by a party, and the result and influence of such changes. Given the complexity of such information and the nature of multi-step design changes, a comprehensive design negotiation system is required. Text based design negotiations, such as the red-lining function in a Word document or markups capability in viewer software, is insufficient to satisfy these requirements. New methodologies and technology are needed to support easy and efficient design negotiations.

The concept of the multi-user design negotiation involves a proposed design change in the format of a "design change suggestion" (DCS) object. A DCS object must include complete information in regarding to the method of the change and all associated data. Such information needs to be captured, preserved, and presentable in any later stage. Parties involved in a design negotiation then can review, discuss, and make decisions about the DCS object. To facilitate this process, it is necessary to allow the parties to perform "what-if" inquiries. For instance, the parties must be able to preview the geometric result as if the DCS object is accepted, and query various physical properties and procurement properties at such stages. Equally important is the ability to modify the DCS object and then preview the geometry and query physical properties and procurement properties. Furthermore, it would be very convenient for the reviewer to compare the design before and after the changes.

With these capabilities, the parties involved in design negotiation will be able to review and modify the DCS object back and forth, and finally they can decide to accept or reject the DCS object.

In one aspect, the present invention relates to a computer-implemented method of performing multi-user design negotiation on a CAD software. In one embodiment, the method includes: (a) receiving, from a first user of the CAD software, a design change to the geometric shape design, and obtaining information of the design change implementable on a CAD model of the geometric shape design through the CAD software, wherein the information of the design change includes shape geometry change and shape attributes change of the design change; (b) storing the information of the design change as a first DCS object; (c) transmitting the first DCS object, together with the CAD model, to a second user of the CAD software; and (d) receiving, from the second user, a first instruction to the first DCS object, and performing a first operation to the geometric shape design corresponding to the first instruction to the first DCS object. In certain embodiments, the first operation includes: (i) retrieving the information of the design change in the first DCS object; (ii) when the first instruction comprises an accepting instruction, incorporating the design change to the geometric shape design according to the information of the design change; (iii) when the first instruction comprises a rejecting instruction, deleting the first DCS object; (iv) when the first instruction comprises a display change instruction, displaying the design change according to the information of the design change; (v) when the first instruction comprises a preview instruction, displaying the geometric shape design with the design change applied according to the information of the design change; (vi) when the first instruction comprises a property query instruction, displaying inquired properties of the geometric shape design having the design change applied according to the information of the design change; (vii) when the first instruction comprises a comparison instruction, displaying geometry and property comparison between the geometric shape design with and without the design change applied according to the information of the design change; (viii) when the instruction comprises an adjustment modification instruction, adjusting the information of the design change; (ix) when the first instruction comprises a replacement modification instruction, creating a replacement design change to the design change; and (x) when the first instruction comprises a sequential modification instruction, creating a sequential design change following the design change such that the design change and the sequential design change form a sequential design change group.

Another aspect of the present invention relates to a CAD multi-user design negotiation system. In certain embodiments, the system includes: a CAD software executable by at least one computing device, configured to implement a geometric shape design; a design change generating module executable by at least one computing device, for receiving a design change to the geometric shape design, obtaining information of the design change, and storing the information of the design change in a design change suggestion (DCS) object, wherein the information of the design change includes shape geometry change and shape attributes change; and a DCS implementing module executable by at least one computing device, for performing an operation to the geometric shape design with the design change according to the DCS object. In certain embodiments, the operation includes: (i) retrieving the information of the design change in the DCS object; (ii) incorporating the design change to the geometric shape design according to the information of the design change in response to an accepting instruction; (iii) deleting the DCS object in response to a rejecting instruction; (iv) displaying the design change according to the information of the design change in response to a display change instruction; (v) displaying the geometric shape design with the design change applied according to the information of the design change in response to a preview instruction; (vi) displaying the inquired properties of the geometric shape design having the design change applied according to the information of the design change in response to a property query instruction; (vii) displaying geometry and property comparison between the geometric shape design with and without the design change applied according to the information of the design change in response to a comparison instruction; (viii) adjusting information of the design change in response to an adjustment modification instruction; (ix) creating a replacement design change to the design change in response to a replacement modification instruction; and (x) creating a sequential design change following the design change such that the design change and the sequential design change form a sequential design change group in response to a sequential modification instruction.

Figure 1B:
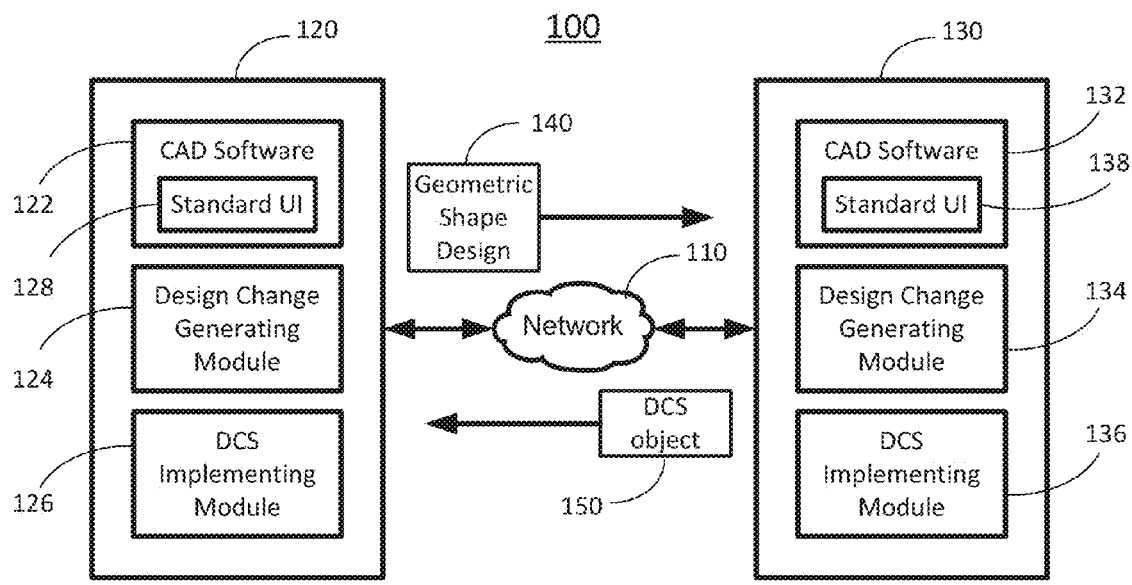

FIGS. 1A and 1B schematically show a CAD multi-user design negotiation system according to certain embodiments of the present invention. As shown in FIG. 1A, the system 100 includes a plurality of computing devices 120 and 130 connected together via a network 110. Each of the computing devices 120 and 130 can be a desktop computer, a laptop computer, a tablet, a mobile device or any other computing system that is capable of executing CAD related software applications. The network 110 may be a wired or wireless network, and may be of various forms such as a local area network (LAN) or wide area network (WAN) including the Internet. A CAD designer 112 is operating the system through the computing device 120, and a general user 114, who is not a designer, is operating the system through the computing device 130.

As shown in FIG. 1B, the computing device 120 includes a CAD software 122, a design change generating module 124, and a DCS implementing module 126. The CAD software 122 has a standard user interface (UI) 128. Similarly, the computing device 130 includes a CAD software 132, a design change generating module 134, and a DCS implementing module 136. The CAD software 132 has a standard user interface (UI) 138.

Each of the CAD software 122 and 132 may be a CAD software application for the CAD designer 112 to create a CAD model of a geometric shape design through the standard UI 128 and 138, or to display an existing geometric shape design through the standard UI 128 and 138 to any user (the CAD designer 112 or the general user 114). For example, the CAD designer 112 may use the CAD software 122 at the computing device 120 to create a CAD model of a geometric shape design file 140, and send the geometric shape design file 140 to the general user 114 at the computing device 130 via the network 110. In certain embodiments, the CAD software 122 and 132 may be the same CAD software application. In certain embodiments, the CAD software 122 and 132 may be different applications, but are compatible to create and display geometric shape design files in the same format such that the geometric shape design files may be exchanged between the CAD software 122 and 132.

Each of the design change generating modules 124 and 134 is a software module for receiving a design change to the geometric shape design 140, obtaining information of the design change, and storing the information of the design change in as a DCS object. In certain embodiments, the information of the design change may include shape geometry change and shape attributes change. For example, the general user 114 may use the design change generating module 134 to create a design change on the geometric shape design 140 created by the CAD designer 112, such that the design change generating module 134 generates a DCS object 150 corresponding to the design change. The general user 114 may then notify the CAD designer 112 and send the DCS object 150, together with the CAD model, back to the CAD designer 112. Similarly, the CAD designer 112 may also use the design change generating module 124 to create a design change in response to input of the general user 114, and send the DCS object generated by the design change generating module 124, together with the CAD model, to the general user 114.

Each of the DCS implementing modules 126 and 136 is a software module for performing an operation to the geometric shape design 140 with the design change according to the DCS object 150. In certain embodiments, the DCS implementing modules 126 and 136 receives an instruction from the user, and performs the operation in response to the instruction. For example, when the CAD designer 112 receives the DCS object 150 from the general user 114 and inputs a what-if instruction to the DCS implementing module 126, the DCS implementing module 126 may perform a what-if operation to the geometric shape design 140 with the design change according to the DCS object 150. When the instruction is an accepting instruction, the DCS implementing module 126 may perform an accepting operation to accept the design change according to the DCS object 150 by incorporating the design change to the geometric shape design 140. When the instruction is a rejecting instruction, the DCS implementing module 126 may perform a rejecting operation to reject the design change by deleting the DCS object 150.

It should be appreciated that the system 100 may include multiple CAD designers 112 and multiple general users 114. In certain embodiments, all users may be CAD designers, or may be general users. In certain embodiments, the CAD designer 112 and the general user 114 may be in operation of the system 100 at the same time to perform real-time negotiation, or may be in operation of the system at different occasions to perform off-line negotiation.

Further, the system 100 may include at least one computing device. In other words, the CAD designer 112 and the general user 114 may operate the system 100 using one single computing device 120 or 130 at different occasions. Thus, the communication between the CAD designer and the general user may be performed within the single computing device 120 or 130, and may not necessarily be via the network 130.

Further, in certain embodiments, when the system 100 includes a plurality of computing devices, the software modules and components (the CAD software 122, the design change generating module 124, and the DCS implementing module 126) may be distributed in the computing devices. In other words, each computing device of the system 100 may only include a part of the software modules and components (the CAD software 122, the design change generating module 124, and the DCS implementing module 126). For example, a general user 114 may operate the system 100 using a client mobile device 130 with only the design change generating module 134, and the DCS implementing module 136 installed thereon to connect to a host server 120 with the CAD software 122 installed thereon. In this case, the general user 114 may access to the functionalities provided by the design change generating module 134 and the DCS implementing module 136, but have no local access to the CAD software. However, the general user 114 may still remotely access the CAD software 122 at the host server 120 through the mobile device 130.

Figure 2:
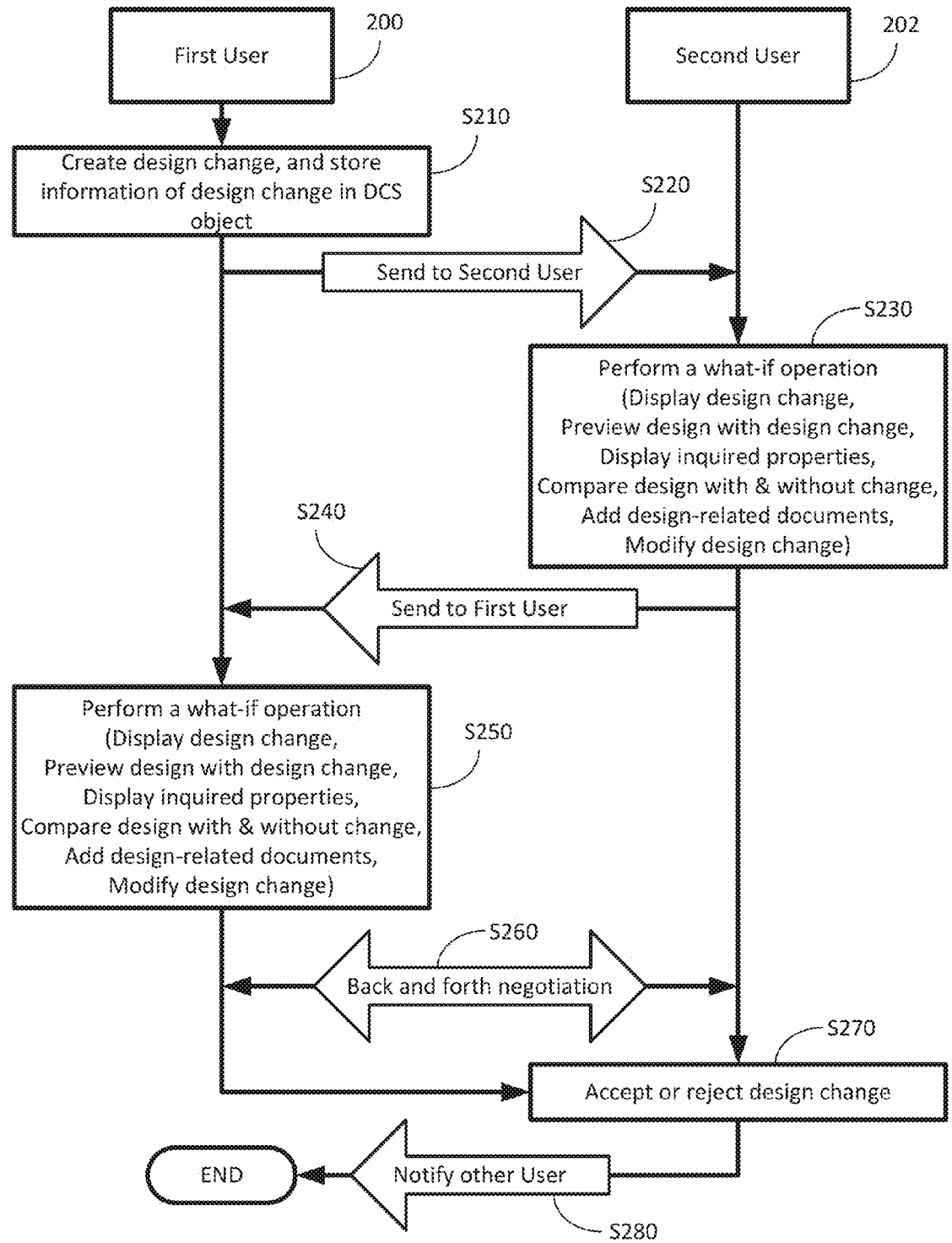
FIG. 2 shows a flowchart of a computer-implemented method of performing multi-user design negotiation on a CAD software according to certain embodiments of the present invention.

FIG. 2 shows a flowchart of a computer-implemented method of performing multi-user design negotiation on a CAD software according to certain embodiments of the present invention. The computer-implemented method may be performed using the system 100 as shown in FIGS. 1A and 1B. As shown in FIG. 2, the method involves a first user 200 and a second user 202. Each of the first user 200 and the second user 202 may be a CAD designer 112 or a general user 114 as shown in FIG. 1A.

As shown in FIG. 2, for a geometric shape design, the first user 200 may create a design change to a geometric shape design through the design change generating module and store the information of the design change in a DCS object (step S210). In certain embodiments, the information of the design change may include shape geometry change of the design change and shape attributes change of the design change. Specifically, the first user 200 may input instructions to create the design change to a computer 130 storing the design change generating module 134. Upon receiving the instruction from the first user 200, the design change generating module 134 may obtain the related shape geometry and shape attributes modification of the design change as the information of the design change, and store the information of the design change in the DCS object.

After the DCS object is generated, the first user 200 may send the DCS object, together with the CAD model, to the second user 202 (step S220). A variety of file transmitting or sharing methods may be used for transmitting the DCS object. For example, the first user 200 may send the DCS object, together with the CAD model, to the second user 202 by e-mails or under the file transfer protocol (FTP). Other file sharing or network transmitting methods may also be used.

When the second user 202 receives the DCS object, the second user 202 may perform an operation to the geometric shape design according to the DCS object by inputting an instruction to the DCS implementing module. For example, when the instruction is a what-if instruction, the DCS implementing module performs a corresponding what-if operation to the DCS object (step S230). Examples of the what-if operation may include: displaying the design change according to the information of the design change; displaying the geometric shape design with the design change applied according to the information of the design change; displaying inquired properties of the geometric shape design having the design change applied according to the information of the design change; displaying geometry and property comparison between the geometric shape design with and without the design change applied according to the information of the design change; adding design-related documents (such as comments) to the geometric shape design; and adjusting the design change. Details of the what-if operation will be described later.

After performing the what-if operation, the second user 202 may send the DCS object, together with the CAD model, back to the first user 200 (step S240). The first user 200 may also perform an operation, such as a what-if operation, to the geometric shape design according to the DCS object by inputting an instruction to the DCS implementing module (step S250). The negotiation process may go back and forth for a plurality of times if needed (step S260).

When one of the users feels that the design change is acceptable or unacceptable, the user may accept or reject the design change. For example, the second user 202, at any point of the negotiation, may decide to accept or to reject the design change (step S270). Once the second user 202 accepts or rejects the design change, the DCS implementing module may send a notification to the other user (the first user 200) that the design change has been accepted or rejected.

In certain embodiments, the design change may involve a plurality of changes of the geometric shape design. Examples of the design change may include: adding a new design feature to the geometric shape design; deleting an existing design feature of the geometric shape design; replacing the existing design feature of the geometric shape design by the new design feature; modifying topology and geometry of the CAD model of the geometry shape design through direct modeling; changing one or more design properties of the existing design feature; changing one or more design attributes of the geometric shape design; and adding a design-related document to the geometric shape design.

Figure 3A:
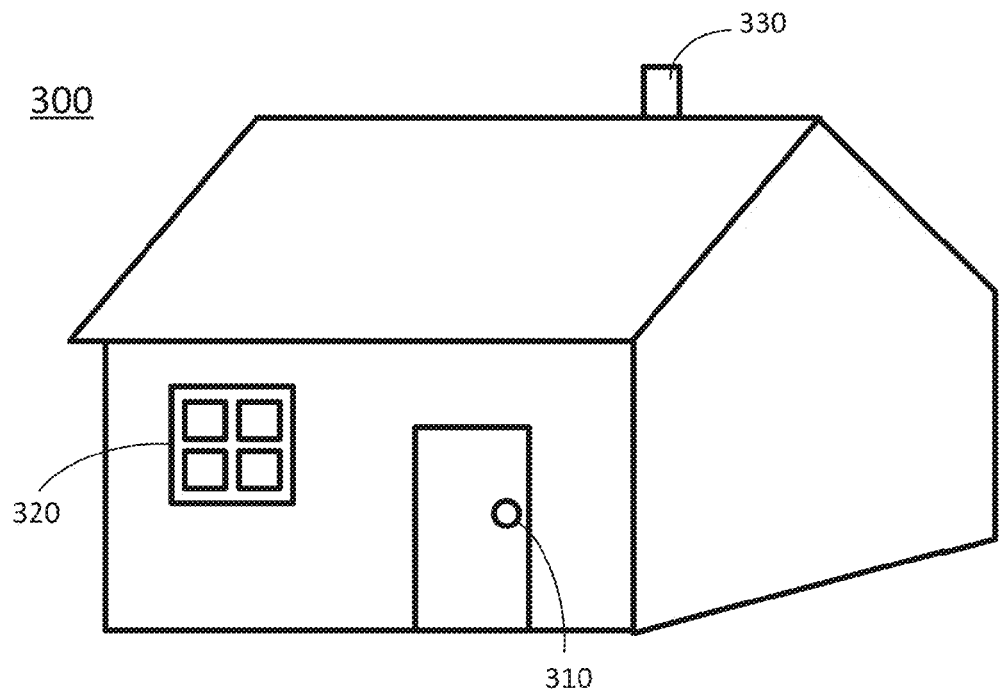
FIG. 3A schematically shows a geometric shape design according to certain embodiments of the present invention.
Figure 3B:
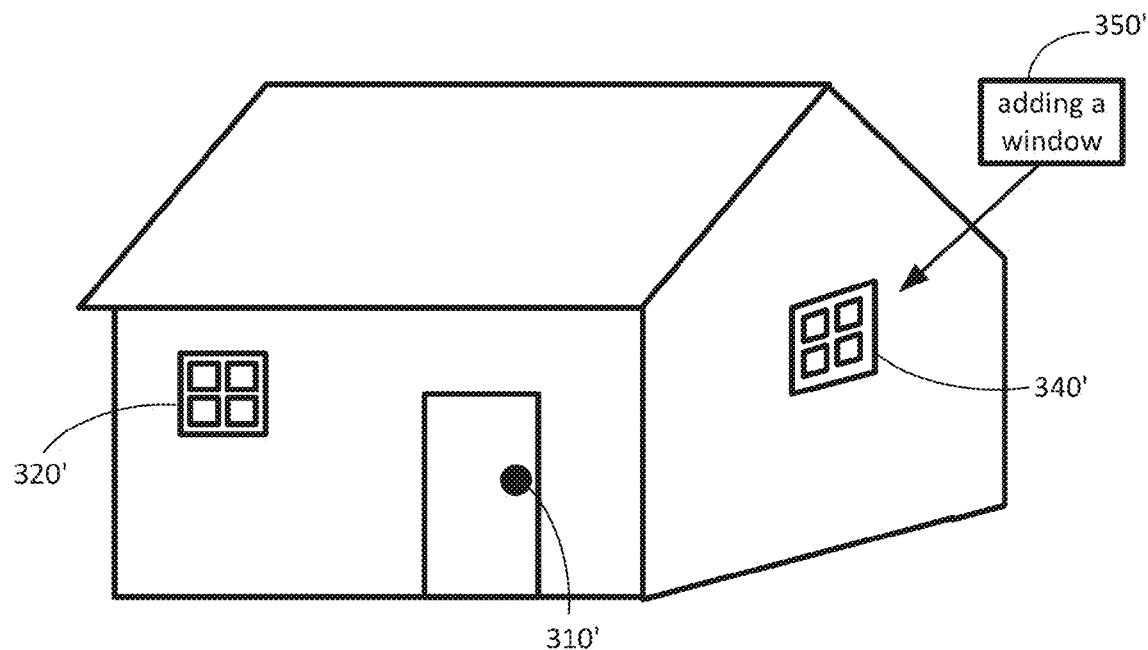
FIG. 3B schematically shows a geometric shape design with design changes according to certain embodiments of the present invention.

FIGS. 3A and 3B schematically show an example of a geometric shape design with design changes according to certain embodiments of the present invention. As shown in FIG. 3A, a geometric shape design of a house 300 is provided. The house 300 has a door with a white door knob 310, a window 320 at the left front side of the house, and a pipe 330 on the roof of the house. As shown in FIG. 3B, the geometric shape design of the house 300' includes certain design changes. For example, a new window 340' is added to the right side of the house 300'. The pipe 330 on the roof is deleted. The white door knob 310 is replaced by a black door knob 310'. The size of the window 320' at the left front side of the house becomes smaller. Further, a comment 350 of "adding a window", which is a design-related document, is provided to indicate the addition of the new window 340'.

As shown in FIG. 3B, the design change includes changing one or more design properties of the existing design feature, such as changing the dimension of an existing design feature (size of the window 320). Other design properties of the existing design feature may include a position of the existing design feature and an orientation of the existing design feature. The design change also includes changing one or more design attributes of the geometric shape design, such as changing the appearance (color of the door knob 310). Other design attributes of the geometric shape design may include material and manufacturing details of the geometric shape design.

It should be appreciated that the changes as shown in FIG. 3B may be incorporated in one design change, or may be separated into multiple design changes based on the user's design implementation decisions. A user who creates the design changes may decide to incorporate all changes into one DCS object, or distribute the design changes into multiple DCS objects.

Further, it should be appreciated that in one design change, modification to the CAD model can be accomplished either by a single step or by multiple steps. As shown in FIG. 3B, the modification (adding a new window 340', deleting the pipe 330, changing color of the door knob 310, changing size of the window 320', adding a comment 350, etc.) in the design change as shown in FIG. 3B can be accomplished by multiple steps by invoking the CAD software functions. This also applies to replacement design change or sequential design change, which will be explained later.

When a user intends to create a design change for a geometric shape design, the user may have two options. A CAD designer, who has the knowledge and skill to operate with the CAD software, may use the CAD software to implement the design change directly on the geometric shape design. Meanwhile, a general user who is not as familiar as the CAD designer with CAD software operation may choose to select from a list of design change options from a predetermined design change template.

Figure 4:
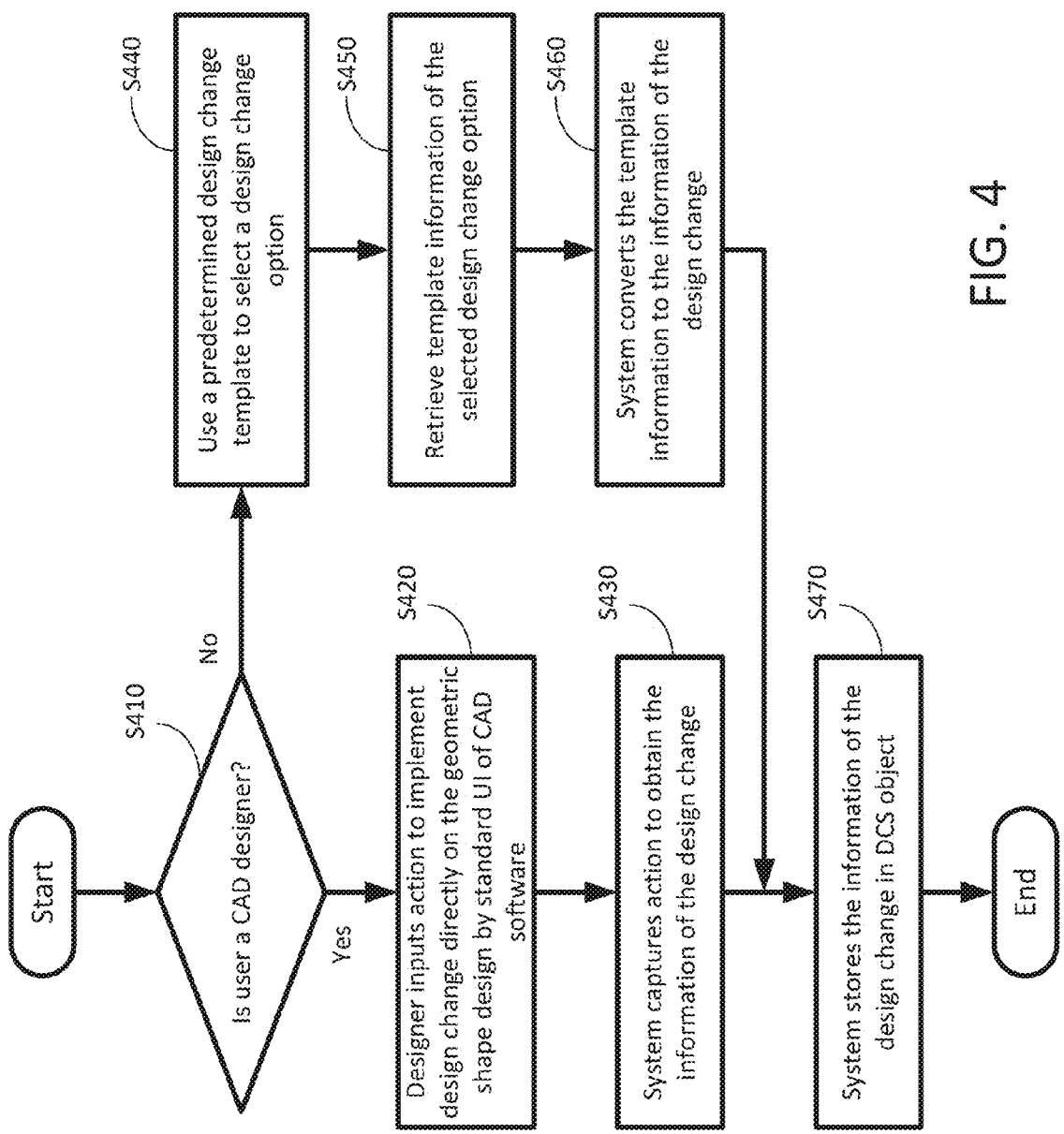
FIG. 4 shows a flowchart of creating a design change and storing the design change in a DCS object according to certain embodiments of the present invention.

FIG. 4 shows a flowchart of creating a design change and storing the design change in a DCS object according to certain embodiments of the present invention. As shown in FIG. 4, the system may provide the user options to operate the system as a CAD designer or not (step S410). If the user decides to operate the system as a CAD designer, the user may input an action, by the standard UI of the CAD software, to implement the design change directly on the geometric shape design (step S420). The system, upon receiving the input action, captures the action to obtain the information of the design change (step S430). Then, the system stores the information of the design change in the DCS object (step S470).

On the other hand, if the user decides to operate the system as a general user without using the CAD software directly, the user may use a predetermined design change template to select a design change option (step S440). Upon receiving the selection, the system retrieves the template information of the selected design change option (step S450), and converts the template information to the information of the design change (step S460). Then, the system stores the information of the design change in the DCS object (step S470).

Figure 5A:
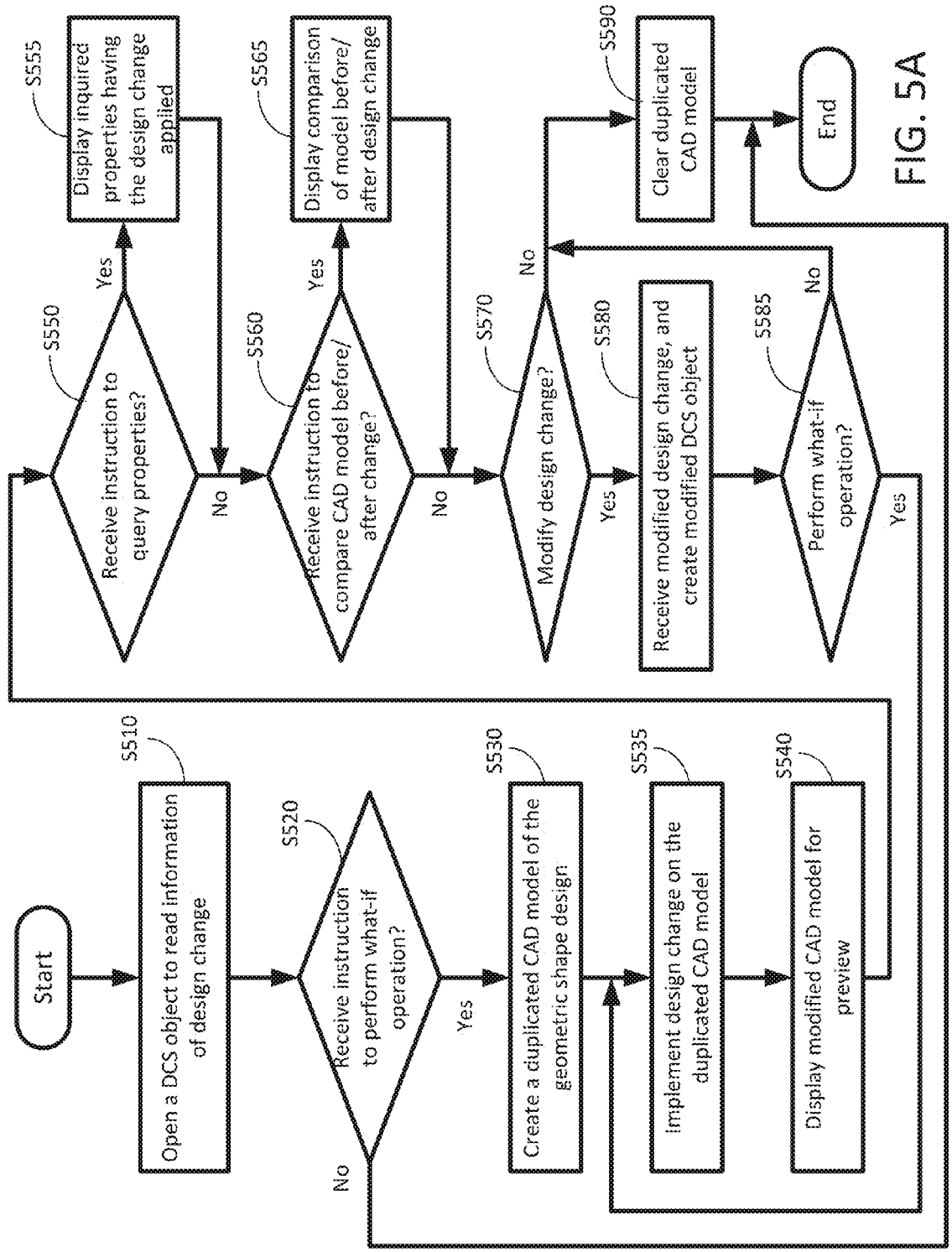
FIG. 5A shows a flowchart of performing what-if operations according to certain embodiments of the present invention.

FIG. 5A shows a flowchart of performing what-if operations according to certain embodiments of the present invention. It should be appreciated that the flowchart shows an example of multiple what-if operations available to the user. In other words, the user may choose to input instructions to perform one or more what-if operations, or choose to skip any operations, if desired.

As shown in FIG. 5A, when the system receives a DCS object, the DCS implementing module opens the DCS object to read information of the design change (step S510). Then, the DCS implementing module determines whether the user inputs a what-if instruction to perform the what-if operation (step S520). If the user does not input the what-if instruction, the operation stops. If the user inputs the what-if instruction, the DCS implementing module performs the what-if operation corresponds to the instruction. For example, the DCS implementing module may create a duplicated CAD model of the geometric shape design (step S530), implement the design change on the duplicated CAD model (step S535) according to the information of the design change obtained from the DCS object, and display the modified model for preview (step S540).

In certain embodiments, the user may input a property query instruction to query the physical properties and procurement properties of the geometric shape design. Thus, the system may determine whether the user inputs such property query instruction (step S550). When the property query instruction is received, the DCS implementing module may display inquired properties of the geometric shape design to the user having the design change applied according to the information of the design change (step S555).

In certain embodiments, when the system determines that the property query instruction is received, the DCS implementing module may display the inquired properties of the geometric shape design by sending the inquiries of the properties to a database, and retrieving the inquired properties of the geometric shape design from the database. In certain embodiments, the database may be a company database, a database of an ERP system of a supplier, or a back office database.

In certain embodiments, the user may input a comparison instruction to compare the geometric shape design before and after the design change. Thus, the system may determine whether the user inputs such comparison instruction (step S560). When the comparison instruction is received, the DCS implementing module may displaying comparison between the geometric shape design with and without the design change applied according to the information of the design change to the user (step S565).

In certain embodiments, the user may decide to input a modifying instruction to further modify the design change. Thus, the system may determine whether the user inputs such modifying instruction (step S570). If the user chooses not to modify the design change, the system may clear the duplicated model (step S590).

When the modifying instruction is received, the user may create a modified design change over the design change, and the system may generate a modified DCS object according to the modified design change (step S580). As described above, the modified design change may involve a plurality of changes of the geometric shape design or the previous design change.

After creating the modified design change, the user may choose to perform other what-if operations (step S585) if desired, and the system goes back to step S535 to implement the modified design change. If the user chooses not to perform other what-if operations, the system may clear the duplicated model (step S590) to end the what-if operations.

It should be appreciated that the modifying process of the design change as described in the steps S570 and S580 may involve different modifications. For example, a modified design change may be a replacement design change to replace the design change, or a sequential design change following the design change. In certain embodiments, the modifying instruction can be an adjustment modification instruction for adjusting the information of the design change without providing a replacement or sequential design change.

Figure 5B:
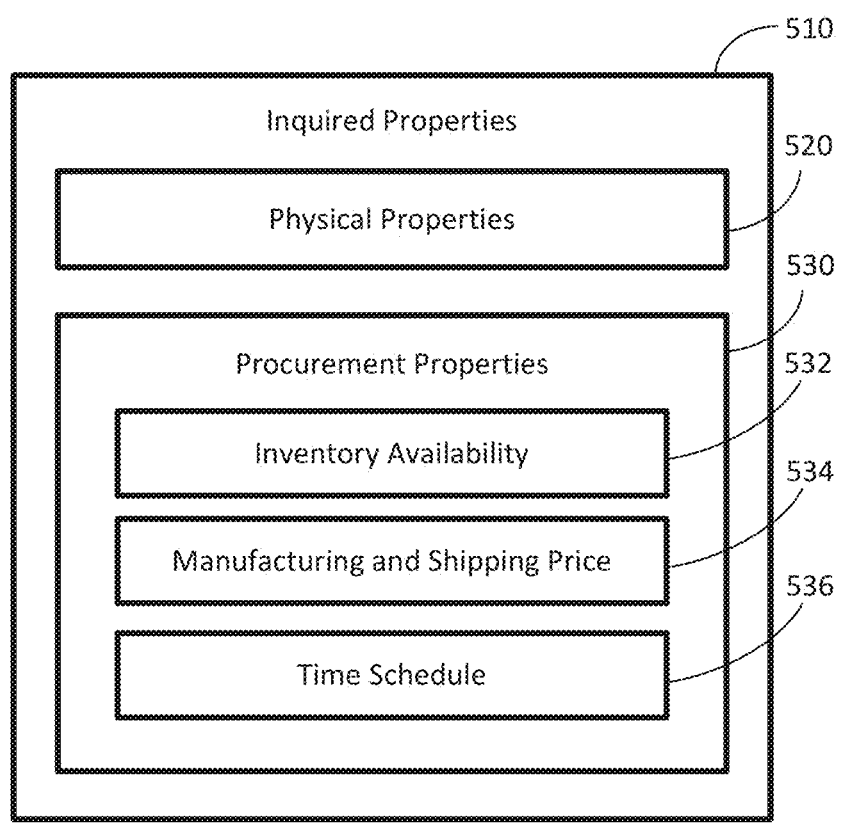
FIG. 5B schematically shows the inquired properties according to certain embodiments of the present invention.

FIG. 5B schematically shows the inquired properties according to certain embodiments of the present invention. As discussed above, the inquired properties 510 of the geometric shape design may include physical properties 520 of the geometric shape design and procurement properties 530 of the geometric shape design. Examples of the procurement properties 530 of the geometric shape design may include inventory availability 532, manufacturing and shipping prices 534, and time schedule 536. For example, a different design or design change may involve different inventory parts, different manufacturing and shipping processes, and different efforts and required time schedules. A user may inquire the procurement properties 530 and consider the inventory availability 532, the price of manufacturing and shipping processes 534, and the time schedule 536 as factors during the comparison process in order to determine between design alternatives.

Figure 6A:
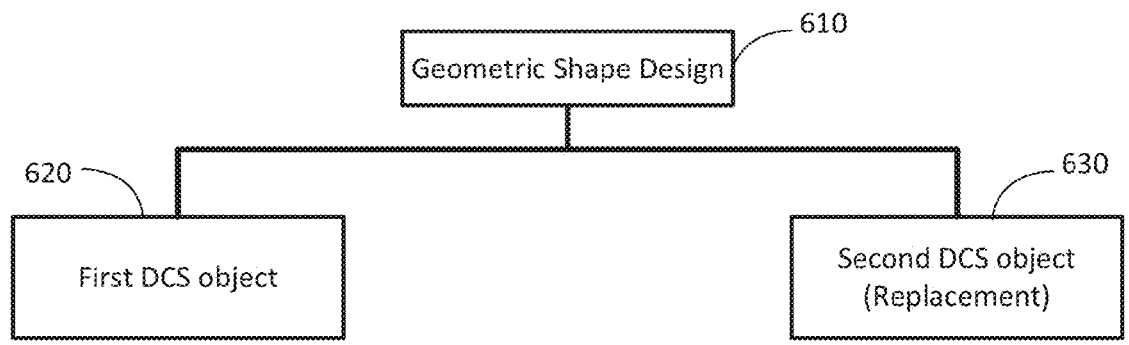
FIG. 6A schematically shows a replacement design change according to certain embodiments of the present invention.
Figure 6B:
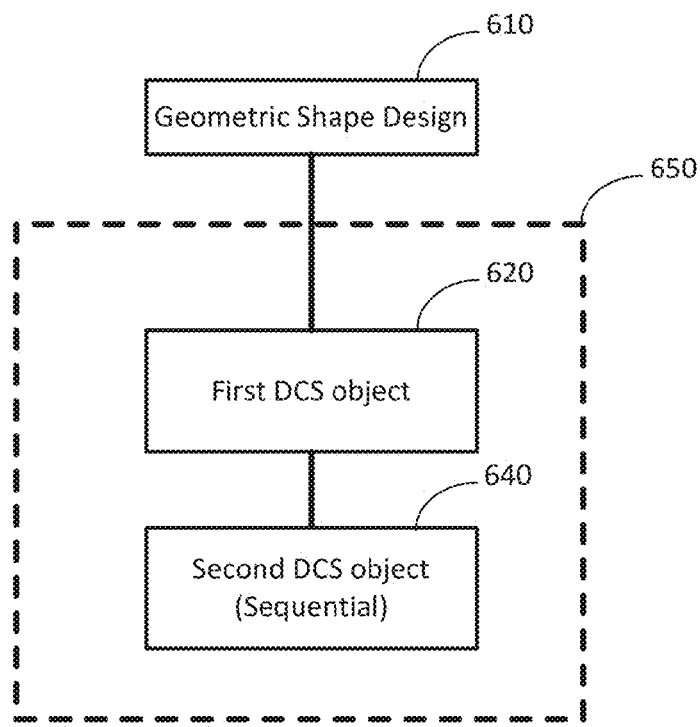
FIG. 6B schematically shows a sequential design change according to certain embodiments of the present invention.

FIGS. 6A and 6B shows examples of the replacement design change and the sequential design change according to certain embodiments of the present invention. As shown in FIG. 6A, a user may receive a first design change 620 over a geometry shape design 610 and decides that the first design change 620 does not fit the geometry shape design 610. Thus, the user may input a replacement modification instruction as the modifying instruction to create a second design change 630 as a replacement design change to the first design change 620. The first design change 620 and the second design change 630 are alternative design changes which cannot be simultaneously implemented. In other words, only one of the first design change 620 and the second design change 630 can be accepted. If the users of the system 100 accept the first design change 620, the second design change 630 is automatically rejected. If the users of the system 100 accept the second design change 630, the first design change 620 is rejected.

On the other hand, as shown in FIG. 6B, a user may receive a first design change 620 over a geometry shape design 610 and decides that the first design change 620 may include further design changes. Thus, the user may input a sequential modification instruction as the modifying instruction to create a third design change 640 as a sequential design change following the first design change 620. The third design change 640 is implemented following the first design change 620 in a sequence. In other words, the first design change 620 and the third design change 640 can be treated as a sequential design change group 650. If the third design change 640 is accepted, the first design change 620 must also be accepted. If the first design change 620 is rejected, the third design change 640 must also be rejected. In certain embodiments, the grouping action is automatically performed. In certain embodiments, the user may input a grouping instruction to combine the DCS object generated from the first design change 620 and the DCS object generated from the third design change 640 to generate a DCS object group, such that the DCS objects can be accepted or rejected as a group.

Figure 7:
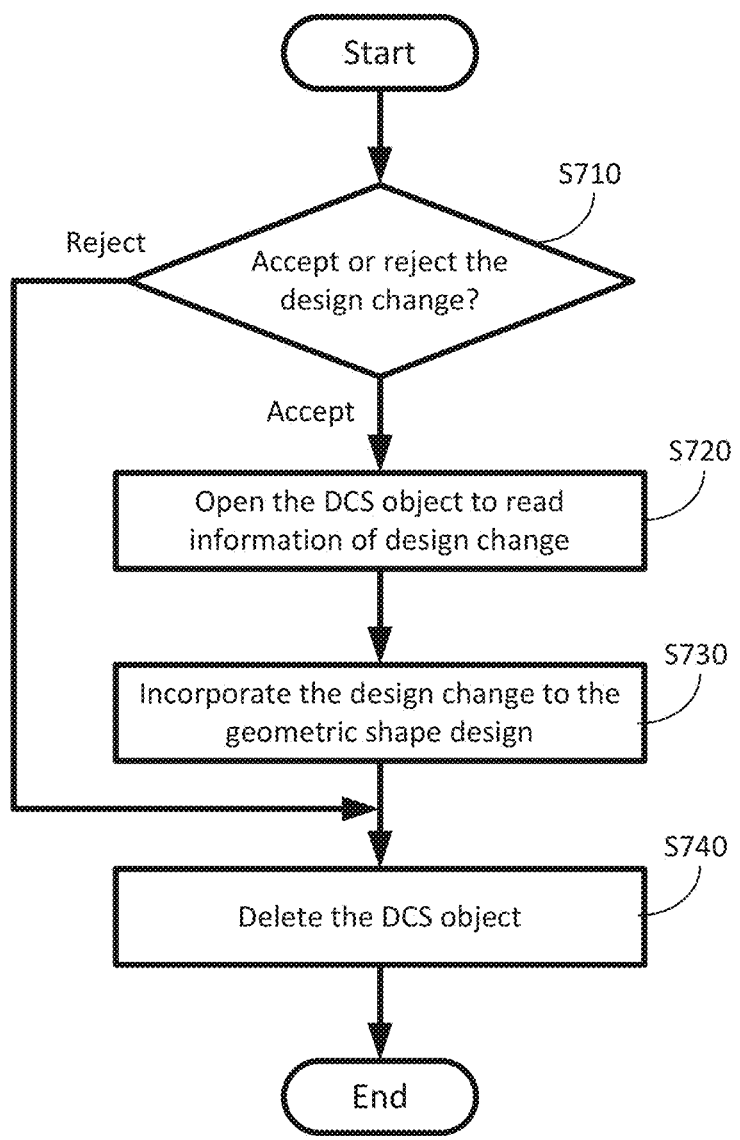
FIG. 7 shows a flowchart of accepting or rejecting the design change according to certain embodiments of the present invention.

FIG. 7 shows a flowchart of accepting or rejecting the design change according to certain embodiments of the present invention. It should be appreciated that the user may, at any time during the what-if operation process, choose to accept or reject the design change. In certain embodiments, the user may accept or reject the design change without performing the what-if operations.

As shown in FIG. 7, when the user inputs an instruction, the DCS implementing module determines whether the instruction is an accepting instruction or a rejection instruction to the design change (step S710). When the user chooses to accept the design change, the DCS implementing module opens the DCS object to read the information of the design change (step S720), and incorporate the design change to the geometric shape design (step S730). After accepting the design change, the system deletes the DCS object (step S740). In certain embodiments, the DCS implementing module automatically incorporates the design change to the geometric shape design according to the information of the design change without further user interaction. When the user chooses to reject the design change, the system goes to step S740 directly to delete the DCS object.

The system and method as described in the embodiments relates to a new design negotiation methodology which is similar to the basic document red-lining approach. However, it offers much more rich tools to facilitate a dynamic way of understanding, modifying, comparing, and making decisions on the DCS object. This new methodology has the following characteristics:

The system and method may capture and present complete information of the DCS object instead of just having comments or the result of changes.

The system and method allows previewing of the changed result and query related physical properties and procurement properties before acceptance of the DCS object.

The system and method allows comparison of differences before and after design changes before acceptance of the DCS object.

The system and method provides options to accept, reject, or modify the DCS object.

The system and method supports a process for back and forth negotiation through DCS objects with or without involving a document management system or a database server.

Once accepted, the design changes may automatically execute.

Further, to support the new design negotiation methodology, the system and method as described in the embodiments includes the following new features:

The system and method provides intuitive UI to specify the design changes either by directly defining the change details or invoking predefined change templates and let the software system convert into change details: Since both designers and non-technical users, such as sales, marketing, and business people need participate in design negotiation, we need a rich interface for designers and a simple interface for non-designer. It is a new idea to have predefined templates representing common changes with a simple interface and the automatic conversion to detail design changes while keeping the consistency.

The system and method may capture and preserve complete design change information in a DCS object: This includes the method of the design change, direct change on the geometry of a shape, its material and other properties, change of a shape's underlining definition including feature history, change of parameter values associated with shape definition or position, change of a shape's position and orientation transformation, change of design intent, etc. It is a new way to pack various kinds of information into a DCS object and associate this object with the shape under design, and allowing reviewers to interact with such an object to facilitate design negotiations.

The system and method enables review of the DCS information, preview its change result, and compare the difference before and after the suggested change: Complete information captured and stored in a DCS object can be reviewed. Any party may perform the "what-if" query and preview the change result, which includes geometry and other physical properties and procurement properties, as if the DCS object has been accepted. Then a comparison between the design, before and after the change, can be performed. The new idea is being able to obtain the geometric result and related physical properties and procurement properties before actually accepting the design changes, and being able to compare the design before and after the changes.

The system and method allows rejecting, accepting, or modifying the DCS object: Modifications can be sent back to the party who proposed the DCS object. Such negotiations can go back and forth multiple times between the parties. DCS rejection or acceptance will trigger automatic notification to related parties. This is an idea with extension from the red-lining in word documents where the new concept is to enable rich set of information associated with process oriented operations, and being able to communicate back and forth with or without involving a document management system or a database server.

The system and method allows adding comments, attaching additional information or related reference document/material to a DCS object: This will assist more sophisticated design negotiations where additional information or supporting document/material is needed. The new idea is to allow customized information be included in design negotiation.

Allow a sequence of multiple design changes to be collected into one DCS object: Each design change can be reviewed and then rejected, accepted, or modified; and the design change result of individual or combinations of multiple design changes can be previewed. It is a new capability, which doesn't exist in any current red-lining technology, to represent sequential dependent multiple changes as one unit.

The system and method allows mutually independent DCS objects to be created and processed: Each one can be processed independently. The idea is to enable multiple parties to participate in design negotiations concurrently.

The system and method allows one DCS object referring to other DCS object to enable combining, replacement, and other ways of considering multiple DCS objects together: For instance, if modification of a DCS object proposes a totally different way of design change, then instead of modifying the original DCS object, one can create a new DCS object defining the new way and cross reference with the original DCS object. This is a new idea to enable associated design changes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

What is claimed is:

1. A computer-implemented method of performing multi-user design negotiation on a computer-aided design (CAD) software, the method comprising:

(a) receiving, from a first user of the CAD software, a design change to a geometric shape design, and obtaining information of the design change implementable on a CAD model of the geometric shape design through the CAD software, wherein the information of the design change comprises shape geometry change of the design change and shape attributes change of the design change;

(b) storing the information of the design change as a first design change suggestion (DCS) object;

(c) transmitting the first DCS object, together with the CAD model, to a second user of the CAD software;

(d) receiving, from the second user, a plurality of first instructions to the first DCS object; and (e) performing a plurality of first operations to the geometric shape design corresponding to the first instructions to the first DCS object, comprising:

(i) retrieving the information of the design change in the first DCS object; and (ii) determining whether the first instructions comprise an accepting instruction; and (iii) in response to determining that the first instructions comprise the accepting instruction, incorporating the design change to the geometric shape design according to the information of the design change; and (iv) determining whether the first instructions comprise a rejecting instruction; and (v) in response to determining that the first instructions comprise the rejecting instruction, deleting the first DCS object; and (vi) determining whether the first instructions comprise a display change instruction; and (vii) in response to determining that the first instructions comprise the display change instruction, displaying the design change according to the information of the design change; and (viii) determining whether the first instructions comprise a preview instruction; and (ix) in response to determining that the first instructions comprise the preview instruction, displaying the geometric shape design with the design change applied according to the information of the design change; and (x) determining whether the first instructions comprise a property query instruction; and (xi) in response to determining that the first instructions comprise the property query instruction, displaying inquired properties of the geometric shape design having the design change applied according to the information of the design change; and (xii) determining whether the first instructions comprise a comparison instruction; and (xiii) in response to determining that the first instructions comprise the comparison instruction, displaying geometry and property comparison between the geometric shape design with and without the design change applied according to the information of the design change; and (xiv) determining whether the first instructions comprise an adjustment modification instruction; and (xv) in response to determining that the first instructions comprise the adjustment modification instruction, adjusting the information of the design change; and (xvi) determining whether the first instructions comprise a replacement modification instruction; and (xvii) a in response to determining that the first instructions comprise the replacement modification instruction, creating a replacement design change to the design change; and (xviii) determining whether the first instructions comprise a sequential modification instruction; and (xix) in response to determining that the first instructions comprise the sequential modification instruction, creating a sequential design change following the design change such that the design change and the sequential design change form a sequential design change group.

2. The computer-implemented method of claim 1, wherein the design change and the replacement design change respectively comprise at least one of:
adding a new design feature;
deleting an existing design feature;
replacing the existing design feature by the new design feature;
modifying topology and geometry of the CAD model through direct modeling;
changing one or more design properties of the existing design feature;
changing one or more design attributes of the geometric shape design; and
adding a design-related document to the geometric shape design.

3. The computer-implemented method of claim 2, wherein the design properties of the existing design feature comprise a position of the existing design feature, an orientation of the existing design feature, and a dimension of the existing design feature.

4. The computer-implemented method of claim 2, wherein the design attributes of the geometric shape design comprise material, appearance, and manufacturing details of the geometric shape design.

5. The computer-implemented method of claim 1, wherein the step (b) comprises:
receiving, from the first user through a standard user interface of the CAD software, an action to implement the design change directly on the geometric shape design; and
capturing the action to implement the design change to obtain the information of the design change.

6. The computer-implemented method of claim 1, wherein the step (b) comprises:
receiving, from the first user through a predetermined design change template, a selection of a design change option of the predetermined design change template as the design change;
retrieving template information of the selected design change option from the predetermined design change template; and
converting the template information to the information of the design change.

7. The computer-implemented method of claim 1, wherein the step (c) comprises:
notifying the second user about the first DCS object.

8. The computer-implemented method of claim 1, wherein the step (iii) further comprises:
in response to the accepting instruction, automatically incorporating the design change to the geometric shape design according to the information of the design change without further user interaction.

9. The computer-implemented method of claim 1, wherein the step (xi) further comprises:
sending inquiries of the properties to a database;
retrieving, from the database, the inquired properties of the geometric shape design having the design change applied according to the information of the design change; and
displaying the inquired properties.

10. The computer-implemented method of claim 9, wherein the database is a company database, a database of an enterprise resource planning (ERP) system of a supplier, or a back office database.

11. The computer-implemented method of claim 1, wherein the inquired properties of the geometric shape design comprise physical properties of the geometric shape design and procurement properties of the geometric shape design.

12. The computer-implemented method of claim 11, wherein the procurement properties of the geometric shape design comprise inventory availability, manufacturing and shipping prices, and time schedule.

13. The computer-implemented method of claim 1, wherein the step (xvii) further comprises:
   obtaining information of the replacement design change implementable on the CAD model of the geometric shape design through the CAD software, wherein the information of the replacement design change comprises shape geometry change of the replacement design change and shape attributes change of the replacement design change;
   storing the information of the replacement design change as a second DCS object;
   transmitting the second DCS object, together with the CAD model, to the first user; and
   receiving, from the first user, a plurality of second instructions to the second DCS object, and performing a plurality of second operations to the geometric shape design corresponding to the second instructions to the second DCS object.

14. The computer-implemented method of claim 13, wherein the second operations comprise:
   (1) retrieving the information of the replacement design change in the second DCS object;
   (2) when the second instructions comprise the accepting instruction, incorporating the replacement design change to the geometric shape design according to the information of the replacement design change;
   (3) when the second instructions comprise the rejecting instruction, deleting the second DCS object;
   (4) when the second instructions comprise the display change instruction, displaying the replacement design change according to the information of the replacement design change;
   (5) when the second instructions comprise the preview instruction, displaying the geometric shape design with the design change applied according to the information of the replacement design change;
   (6) when the second instructions comprise the property query instruction, displaying the inquired properties of the geometric shape design having the design change applied according to the information of the replacement design change;
   (7) when the second instructions comprise the comparison instruction, displaying geometry and property comparison between the geometric shape design with and without the replacement design change applied according to the information of the replacement design change;
   (8) when the second instructions comprise the adjustment modification instruction, adjusting information of the replacement design change; and
   (9) when the second instructions comprise the sequential modification instruction, creating a sequential design change following the replacement design change such that the replacement design change and the sequential design change form a sequential design change group.

15. The computer-implemented method of claim 14, wherein the step (2) comprises:
   in response to the accepting instruction, automatically incorporating the replacement design change to the geometric shape design according to the information of the replacement design change without further user interaction.

16. The computer-implemented method of claim 1, wherein the step (xix) further comprises:
   obtaining information of the sequential design change implementable following the design change through the CAD software, wherein the information of the sequential design change comprises shape geometry change of the sequential design change and shape attributes change of the sequential design change;
   storing the information of the sequential design change as a third DCS object;
   transmitting the third DCS object, together with the CAD model, to the first user; and
   receiving, from the first user, a plurality of third instructions to the third DCS object, and performing a plurality of third operations to the geometric shape design corresponding to the third instructions to the third DCS object.

17. The computer-implemented method of claim 16, wherein the third operations comprise:
   (A) retrieving the information of the design change in the first DCS object and the information of the sequential design change in the third DCS object;
   (B) when the third instructions comprise the accepting instruction, incorporating the design change and the sequential design change to the geometric shape design according to the information of the design change and the information of the sequential design change;
   (C) when the third instructions comprise the rejecting instruction, deleting the first DCS object and the third DCS object;
   (D) when the third instructions comprise the display change instruction, displaying the sequential design change according to the information of the sequential design change;
   (E) when the third instructions comprise the preview instruction, displaying the geometric shape design with the design change and the sequential design change both applied according to the information of the design change and the information of the sequential design change;
   (F) when the third instructions comprise the property query instruction, displaying the inquired properties of the geometric shape design having the design change and the sequential design change both applied according to the information of the design change and the information of the sequential design change;
   (G) when the third instructions comprise the comparison instruction, displaying geometry and property comparison between the geometric shape design with and without the design change and the sequential design change both applied according to the information of the design change and the information of the sequential design change; and
   (H) when the third instructions comprise the adjustment modification instruction, adjusting information of the sequential design change.

18. The computer-implemented method of claim 17, wherein the step (B) comprises:
   in response to the accepting instruction, automatically incorporating the design change and the sequential design change to the geometric shape design according to the information of the design change and the information of the sequential design change without further user interaction.

19. A computer-implemented method of performing multi-user design negotiation on a computer-aided design (CAD) software, the method comprising:
(a) receiving, from a first user of the CAD software, a design change to a geometric shape design, and obtaining information of the design change implementable on a CAD model of the geometric shape design through the CAD software, wherein the information of the design change comprises shape geometry change of the design change and shape attributes change of the design change;
(b) storing the information of the design change as a design change suggestion (DCS) object;
(c) transmitting the DCS object, together with the CAD model, to a second user of the CAD software, and notifying the second user about the DCS object;
(d) receiving, from the second user, a plurality of instructions; and
(e) performing a plurality of operations to the geometric shape design corresponding to the instructions, wherein the operations comprise:
(i) retrieving the information of the design change in the DCS object; and
(ii) determining whether the instructions comprise an accepting instruction; and
(iii) in response to determining that the instructions comprise the accepting instruction, incorporating the design change to the geometric shape design according to the information of the design change; and
(iv) determining whether the instructions comprise a rejecting instruction; and
(v) in response to determining that the instructions comprise the rejecting instruction, deleting the DCS object; and
(vi) determining whether the instructions comprise a display change instruction; and
(vii) in response to determining that the instructions comprise the display change instruction, displaying the design change according to the information of the design change; and
(viii) determining whether the instructions comprise a preview instruction; and
(ix) in response to determining that the instructions comprise the preview instruction, displaying the geometric shape design with the design change applied according to the information of the design change; and
(x) determining whether the instructions comprise a property query instruction; and
(xi) in response to determining that the instructions comprise the property query instruction, displaying inquired properties of the geometric shape design having the design change applied according to the information of the design change; and
(xii) determining whether the instructions comprise a comparison instruction; and
(xiii) in response to determining that the instructions comprise the comparison instruction, displaying geometry and property comparison between the geometric shape design with and without the design change applied according to the information of the design change; and
(xiv) determining whether the instructions comprise an adjustment modification instruction; and
(xv) in response to determining that the instructions comprise the adjustment modification instruction, adjusting the information of the design change; and
(xvi) determining whether the instructions comprise a replacement modification instruction; and
(xvii) in response to determining that the instructions comprise the replacement modification instruction, creating a replacement design change to the design change; and
(xviii) determining whether the instructions comprise a sequential modification instruction; and
(xix) in response to determining that the instructions comprise the sequential modification instruction, creating a sequential design change following the design change such that the design change and the sequential design change form a sequential design change group.

20. The computer-implemented method of claim 19, wherein the design change comprises at least one of:
adding a new design feature to the geometric shape design;
deleting an existing design feature of the geometric shape design;
replacing the existing design feature of the geometric shape design by the new design feature;
modifying topology and geometry of the CAD model of the geometry shape design through direct modeling;
changing one or more design properties of the existing design feature of the geometric shape design;
changing one or more design attributes of the geometric shape design; and
adding a design-related document to the geometric shape design.

21. The computer-implemented method of claim 20, wherein the design properties of the existing design feature comprise a position of the existing design feature, an orientation of the existing design feature, and a dimension of the existing design feature.

22. The computer-implemented method of claim 20, wherein the design attributes of the geometric shape design comprise material, appearance, and manufacturing details of the geometric shape design.

23. The computer-implemented method of claim 19, wherein the step (b) comprises:
receiving, from the first user through a standard user interface of the CAD software, an action to implement the design change directly on the geometric shape design; and
capturing the action to implement the design change to obtain the information of the design change.

24. The computer-implemented method of claim 19, wherein the step (b) comprises:
receiving, from the first user through a predetermined design change template, a selection of a design change option of the predetermined design change template as the design change;
retrieving template information of the selected design change option from the predetermined design change template; and
converting the template information to the information of the design change.

25. The computer-implemented method of claim 19, wherein the replacement design change comprises at least one of:
adding a new design feature to the geometric shape design;

deleting an existing design feature of the geometric shape design;

replacing the existing design feature of the geometric shape design by the new design feature;

modifying topology and geometry of the CAD model of the geometry shape design through direct modeling;

changing one or more design properties of the existing design feature of the geometric shape design;

changing one or more design attributes of the geometric shape design; and adding a design-related document to the geometric shape design.

26. The computer-implemented method of claim 19, wherein the sequential design change comprises at least one of:

adding a new design feature following the design change;

deleting an existing design feature following the design change;

replacing the existing design feature following the design change by the new design feature;

modifying topology and geometry of the CAD model through direct modeling following the design change;

changing one or more design properties of the existing design feature following the design change;

changing one or more design attributes of the geometric shape design; and adding a design-related document to the geometric shape design following the design change.

27. The computer-implemented method of claim 19, wherein the step (xi) further comprises:

sending inquiries of the properties to a database;

retrieving, from the database, the inquired properties of the geometric shape design having the design change applied according to the information of the design change; and displaying the inquired properties.

28. The computer-implemented method of claim 27, wherein the database is a company database, a database of an enterprise resource planning (ERP) system of a supplier, or a back office database.

29. The computer-implemented method of claim 19, wherein the inquired properties of the geometric shape design comprise physical properties of the geometric shape design and procurement properties of the geometric shape design.

30. The computer-implemented method of claim 29, wherein the procurement properties of the geometric shape design comprise inventory availability, manufacturing and shipping prices, and time schedule.

31. The computer-implemented method of claim 19, wherein the step of accepting the design change comprises:

retrieving the information of the design change in the DCS object; and automatically incorporating the design change to the geometric shape design according to the information of the design change without further user interaction.

32. The computer-implemented method of claim 19, wherein the step of rejecting the design change comprises deleting the DCS object.

33. A computer-aided design (CAD) multi-user design negotiation system, comprising:

at least one computing device;

a CAD software executable by the at least one computing device, configured to implement a geometric shape design;

a design change generating module executable by the at least one computing device, for receiving a design change to the geometric shape design, obtaining information of the design change, and storing the information of the design change in as a design change suggestion (DCS) object, wherein the information of the design change comprises shape geometry change of the design change and shape attributes change of the design change; and a DCS implementing module executable by the at least one computing device, for performing a plurality of operations to the geometric shape design with the design change according to the DCS object, wherein the operations comprise:

(i) retrieving the information of the design change in the DCS object; and (ii) determining whether an accepting instruction is received, and incorporating the design change to the geometric shape design according to the information of the design change in response to the accepting instruction; and (iii) determining whether a rejecting instruction is received, and deleting the DCS object in response to the rejecting instruction; and (iv) determining whether a display change instruction is received, and displaying the design change according to the information of the design change in response to a display change instruction; and (v) determining whether a preview instruction is received, and displaying the geometric shape design with the design change applied according to the information of the design change in response to the preview instruction; and (vi) determining whether a property query instruction is received, and displaying inquired properties of the geometric shape design having the design change applied according to the information of the design change in response to the property query instruction; and (vii) determining whether an comparison instruction is received, and displaying geometry and property comparison between the geometric shape design with and without the design change applied according to the information of the design change in response to the comparison instruction; and (viii) determining whether an adjustment modification instruction is received, and adjusting the information of the design change in response to the adjustment modification instruction; and (ix) determining whether a replacement modification instruction is received, and creating a replacement design change to the design change in response to the replacement modification instruction; and (x) determining whether a sequential modification instruction is received, and creating a sequential design change following the design change in response to the sequential modification instruction such that the design change and the sequential design change form a sequential design change group.

34. The CAD multi-user design negotiation system of claim 33, wherein the design change and the replacement design change respectively comprise at least one of:

adding a new design feature;

deleting an existing design feature;

replacing the existing design feature by the new design feature;

modifying topology and geometry of the CAD model through direct modeling;

changing one or more design properties of the existing design feature;

changing one or more design attributes of the geometric shape design; and adding a design-related document to the geometric shape design.

35. The CAD multi-user design negotiation system of claim 34, wherein the design properties of the existing design feature comprise a position of the existing design feature, an orientation of the existing design feature, and a dimension of the existing design feature.

36. The CAD multi-user design negotiation system of claim 34, wherein the design attributes of the geometric shape design comprise material, appearance, and manufacturing details of the geometric shape design.

37. The CAD multi-user design negotiation system of claim 33, wherein the sequential design change comprises at least one of:

adding a new design feature following the design change;

deleting an existing design feature following the design change;

replacing the existing design feature following the design change by the new design feature;

modifying topology and geometry of the CAD model through direct modeling following the design change;

changing one or more design properties of the existing design feature following the design change;

changing one or more design attributes of the geometric shape design; and adding a design-related document to the geometric shape design following the design change.

38. The CAD multi-user design negotiation system of claim 37, wherein the design properties of the existing design feature comprise a position of the existing design feature, an orientation of the existing design feature, and a dimension of the existing design feature.

39. The CAD multi-user design negotiation system of claim 37, wherein the design attributes of the geometric shape design comprise material, appearance, and manufacturing details of the geometric shape design.

40. The CAD multi-user design negotiation system of claim 33, wherein the design change generating module is configured to:

receive, through a standard user interface of the CAD software, an action to implement the design change directly on the geometric shape design; and capture the action to implement the design change to obtain the information of the design change.

41. The CAD multi-user design negotiation system of claim 33, wherein the design change generating module comprises a predetermined design change template.

42. The CAD multi-user design negotiation system of claim 41, wherein the design change generating module is configured to:

receive a selection of a design change option of the predetermined design change template as the design change;

retrieve template information of the selected design change option from the predetermined design change template; and convert the template information to the information of the design change.

43. The CAD multi-user design negotiation system of claim 33, wherein the step (vi) further comprises:

sending inquiries of the properties to a database;

retrieving, from the database, the inquired properties of the geometric shape design having the design change applied according to the information of the design change; and displaying the inquired properties.

44. The CAD multi-user design negotiation system of claim 43, wherein the database is a company database, a database of an enterprise resource planning (ERP) system of a supplier, or a back office database.

45. The CAD multi-user design negotiation system of claim 33, wherein the inquired properties of the geometric shape design comprise physical properties of the geometric shape design and procurement properties of the geometric shape design.

46. The CAD multi-user design negotiation system of claim 45, wherein the procurement properties of the geometric shape design comprise inventory availability, manufacturing and shipping prices, and time schedule.

47. The CAD multi-user design negotiation system of claim 33, wherein the at least one computing device is a desktop computer, a laptop computer, a tablet device, or a mobile device.

* * * * *